United States Patent
Fukui et al.

(10) Patent No.: US 9,648,291 B2
(45) Date of Patent: May 9, 2017

(54) LIGHT SOURCE DEVICE AND PROJECTION TYPE IMAGE DISPLAY DEVICE

(71) Applicant: HITACHI MAXELL, LTD., Ibaraki-shi (JP)

(72) Inventors: Masayuki Fukui, Ibaraki (JP); Kei Adachi, Ibaraki (JP); Chohei Ono, Ibaraki (JP)

(73) Assignee: Hitachi Maxell, Ltd., Osaka (JP)

(*) Notice: Subject to any disclaimer, the term of this patent is extended or adjusted under 35 U.S.C. 154(b) by 50 days.

(21) Appl. No.: 14/786,515

(22) PCT Filed: Apr. 22, 2013

(86) PCT No.: PCT/JP2013/061714
§ 371 (c)(1),
(2) Date: Oct. 22, 2015

(87) PCT Pub. No.: WO2014/174560
PCT Pub. Date: Oct. 30, 2014

(65) Prior Publication Data
US 2016/0088273 A1 Mar. 24, 2016

(51) Int. Cl.
*G03B 21/14* (2006.01)
*H04N 9/31* (2006.01)
(Continued)

(52) U.S. Cl.
CPC ............ *H04N 9/3158* (2013.01); *F21V 9/08* (2013.01); *G02B 26/007* (2013.01);
(Continued)

(58) Field of Classification Search
CPC G03B 21/204; G03B 21/2033; G02B 26/007; F21V 9/08
See application file for complete search history.

(56) References Cited

U.S. PATENT DOCUMENTS 9,388,965 B2 * 7/2016 Miyoshi .................. F21V 13/08
2005/0219478 A1 10/2005 Yoshii et al.
(Continued)

FOREIGN PATENT DOCUMENTS

CN 102563410 A 7/2012
JP 2005-316406 A 11/2005
(Continued)

OTHER PUBLICATIONS

Chinese Office Action issued in corresponding Chinese Patent Application No. 201380075865.8, mailed on Jun. 2, 2016.
(Continued)

*Primary Examiner* — William C Dowling
(74) *Attorney, Agent, or Firm* — McDermott Will & Emery LLP

(57) ABSTRACT

Provided is a light source device where the number of optical components is reduced without lowering an efficiency for light utilization. The light source device includes an excitation light source which generates blue laser light as excitation light, a phosphor wheel including a phosphor which is excited by the excitation light from the excitation light source to generate yellow fluorescent light, and a mirror which guides the excitation light from the excitation light source to the phosphor wheel and transmits the fluorescent light from the phosphor wheel, wherein the mirror includes a first region which reflects the excitation light and transmits the fluorescent light and a second region which transmits the fluorescent light and diffused excitation light which is diffused and reflected in the phosphor. The yellow fluorescent light and the diffused excitation light passing through the mirror are mixed to generate white light.

17 Claims, 7 Drawing Sheets

(51) Int. Cl.
*F21V 9/08* (2006.01)
*G02B 26/00* (2006.01)
*G03B 21/20* (2006.01)
*G03B 33/00* (2006.01)
*G02B 27/14* (2006.01)

(52) U.S. Cl.
CPC ......... *G02B 26/008* (2013.01); *G02B 27/141* (2013.01); *G03B 21/204* (2013.01); *G03B 21/2066* (2013.01); *G03B 33/00* (2013.01); *H04N 9/3161* (2013.01); *H04N 9/3164* (2013.01)

(56) References Cited

U.S. PATENT DOCUMENTS

| | | |
|---|---|---|
| 2010/0328632 A1 | 12/2010 | Kurosaki et al. |
| 2011/0310363 A1 | 12/2011 | Kita |
| 2012/0019786 A1* | 1/2012 | Kimura .................. G03B 21/14 353/31 |
| 2012/0154767 A1* | 6/2012 | Kimura .................. H04N 9/315 353/98 |
| 2012/0242912 A1 | 9/2012 | Kitano |
| 2013/0194551 A1 | 8/2013 | Zhang et al. |
| 2016/0026076 A1* | 1/2016 | Hu ....................... G03B 21/204 353/84 |
| 2016/0085143 A1* | 3/2016 | Hu ..................... G03B 21/2013 362/553 |
| 2016/0088273 A1* | 3/2016 | Fukui .................. G03B 21/204 353/31 |

FOREIGN PATENT DOCUMENTS

| | | |
|---|---|---|
| JP | 2011-013313 A | 1/2011 |
| JP | 2012-004009 A | 1/2012 |
| JP | 2012-014972 A | 1/2012 |
| JP | 2012-015001 A | 1/2012 |
| JP | 2012-027106 A | 2/2012 |
| JP | 2012-128297 A | 7/2012 |
| JP | 2012-141495 A | 7/2012 |
| JP | 2012-212129 A | 11/2012 |

OTHER PUBLICATIONS

Japanese Office Action issued in corresponding Japanese Patent Application No. 2015-513367, mailed on Jul. 19, 2016.
International Search Report issued in corresponding International Patent Application No. PCT/JP2013/061714, mailed on Jul. 23, 2013; with English translation.

* cited by examiner

F I G . 1
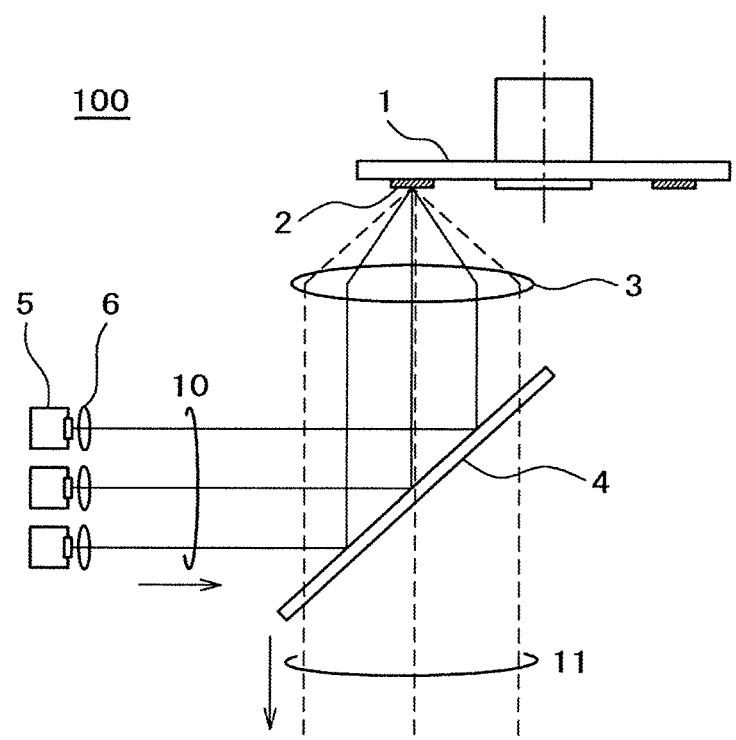

(a)

(b)

US 9,648,291 B2

LIGHT SOURCE DEVICE AND PROJECTION TYPE IMAGE DISPLAY DEVICE

RELATED APPLICATIONS

This application is the U.S. National Phase under 35 U.S.C. §371 of International Patent Application No. PCT/JP2013/061714, filed on Apr. 22, 2013, the disclosure of which Application is incorporated by reference herein.

TECHNICAL FIELD

The present invention relates to a light source device and a projection type image display device.

BACKGROUND ART

In the related art, a light source device converting excitation light emitted from a solid state light source into visible light by using a phosphor and emitting the visible light at a good efficiency has been proposed. Patent Document 1 discloses a configuration of irradiating a circular plate (phosphor wheel) where the phosphor is formed with excitation light (blue laser light) emitted from a light source to emit a plurality of fluorescent light beams (red light beams, green light beams) and using the plurality of the fluorescent light beams as illumination light.

CITATION LIST

Patent Document

Patent Document 1: JP 2011-13313 A

SUMMARY OF THE INVENTION

Problems to be Solved by the Invention

According to Patent Document 1, excitation light passing through a phosphor wheel and fluorescent light generated in the phosphor wheel are emitted to the opposite sides interposing the phosphor wheel. Therefore, the number of optical components for combining the light beams is increased, and thus, there is a problem in that the size of the light source device is enlarged. In addition, optical loss occurs due to a plurality of optical components arranged in an optical system, and thus, there is a problem in that efficiency for light utilization (intensity of illumination light) is lowered.

The present invention is to provide a light source device where the number of optical components is reduced without lowering efficiency for light utilization.

Solution to Problems

In order to solve the above problems, one of the preferred aspects of the the present invention is as follows. The light source device includes an excitation light source which generates blue laser light as excitation light, a phosphor wheel including a phosphor which is excited by the excitation light from the excitation light source to generate yellow fluorescent light, and a mirror which guides the excitation light from the excitation light source to the phosphor wheel and transmits the fluorescent light from the phosphor wheel, wherein the mirror includes a first region which reflects the excitation light and transmits the fluorescent light and a second region which transmits the fluorescent light and diffused excitation light which is diffused and reflected in the phosphor.

Effect of the Invention

According to the present invention, it is possible to provide a light source device where the number of optical components is reduced without lowering efficiency for light utilization.

BRIEF DESCRIPTION OF THE DRAWINGS

FIG. 1 is a configurational diagram of a light source device according to a first embodiment.

MODES FOR CARRYING OUT THE INVENTION

Figure 2:
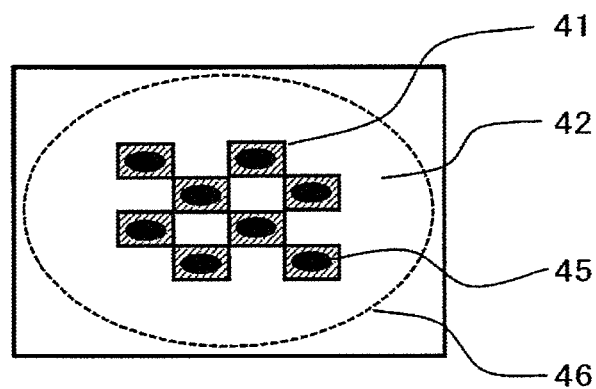
FIG. 2 is a diagram illustrating a specific example of a mirror 4.
Figure 2:
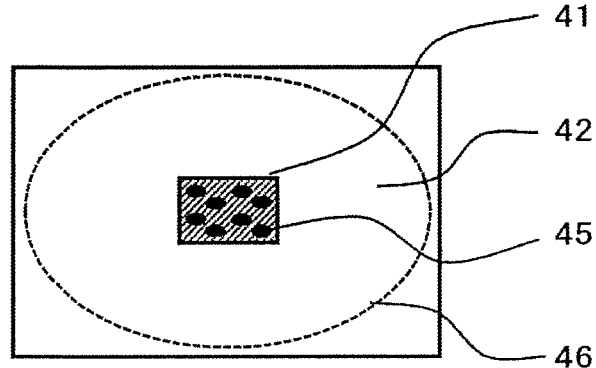

Hereinafter, embodiments of the present invention will be described with reference to the drawings. Hereinafter, red, green, blue, yellow, and white are denoted by R, G, B, Y, and W, respectively.

First Embodiment

FIG. 1 is a configurational diagram of a light source device according to a first embodiment. The light source device 100 is configured to include an excitation light source 5, a mirror 4, and a phosphor wheel 1 as main components. The excitation light source 5 is configured so that one or more solid state light emitting elements such as laser light emitting elements are arranged, and the excitation light source emits B (blue) laser light as excitation light. The excitation light 10 (indicated by a solid line) emitted from the excitation light source 5 is formed as substantially parallel light by a collimating lens 6 to be incident on the mirror 4.

FIG. 2 is a diagram illustrating a specific example (herein, two examples) of the mirror 4. The mirror 4 is configured with two regions. A first region is a dichroic coat region 41 (oblique line portion) having characteristics of reflecting a wavelength range of excitation light (B) and transmitting a wavelength range (Y) of fluorescent light. A second region is a wide wavelength transmission region 42 (white portion) transmitting wavelength ranges of both of the excitation light and the fluorescent light. The first region is configured so as to be smaller than the second region.

The excitation light 10 is reflected on the dichroic coat region 41 of the mirror 4 and is condensed by a condensing lens 3 to be incident on the phosphor wheel 1. Next, substantially all the fluorescent light beams emitted from a phosphor 2 on the phosphor wheel 1 and most of diffused excitation light beams which are diffused as excitation light beams without conversion into the fluorescent light beams are emitted as illumination light beams 11 downward in the figure (FIG. 1).

In the example of FIG. 2(*a*), in the central portion of an incidence plane of the mirror 4, the dichroic coat region 41 is divided in a checkered pattern, and the other region is defined as a wide wavelength transmission region 42. The number of divisions of the dichroic coat region 41 and the size and arrangement of each division are determined according to the number of incidence spots 45 (black) of the excitation light beams 10 from the excitation light source 5 and the shape and position of the incidence spots 45. Therefore, the excitation light 10 is reflected on the incidence spot 45, and substantially all the excitation light beams 10 are directed toward the phosphor wheel 1.

On the other hand, the diffused excitation light and the fluorescent light generated in the phosphor 2 on the phosphor wheel 1 are enlarged to be incident on the spot 46 (broken line) of the incidence plane of the mirror 4. Among the light beams, substantially most of the fluorescent light beams in the spot 46 pass to be the illumination light. On the other hand, among the diffused excitation light beams, the light beams incident on the dichroic coat region 41 do not pass to be a loss of the illumination light, and most of the diffused excitation light beams incident on the wide wavelength transmission region 42 having a large area pass to be the illumination light.

An example of FIG. 2(*b*) is a form different from that of FIG. 2(*a*) is illustrated. The difference from FIG. 2(*a*) is that the dichroic coat region 41 is installed in a rectangular (or square) shape in the central portion of the incidence plane of the mirror 4. In this case, since the incidence spot 45 is small, all the spots 45 can be received within one dichroic coat region 41. In comparison with FIG. 2(*a*), since the area of the dichroic coat region 41 can be formed to be small, the loss of the illumination light caused by the dichroic coat region 41 is reduced.

The loss of the illumination light in the dichroic coat region 41 depends on the area of the dichroic coat region 41. According to simulation, if the area of the dichroic coat region 41 is reduced to be, for example, 3% or less of the incidence spot 46, it is possible to suppress the loss of the illumination light to be the loss equivalent to the case of Patent Document 1.

In this manner, in the mirror 4 according to the embodiment, the dichroic coat region 41 is selectively installed in the wide wavelength transmission region 42, so that the excitation light 10 from the excitation light source 5 can be reflected to be guided to the phosphor 2 on the phosphor wheel 1 and the diffused excitation light and the fluorescent light from the phosphor 2 can pass to be the illumination light 11.

Figure 3:
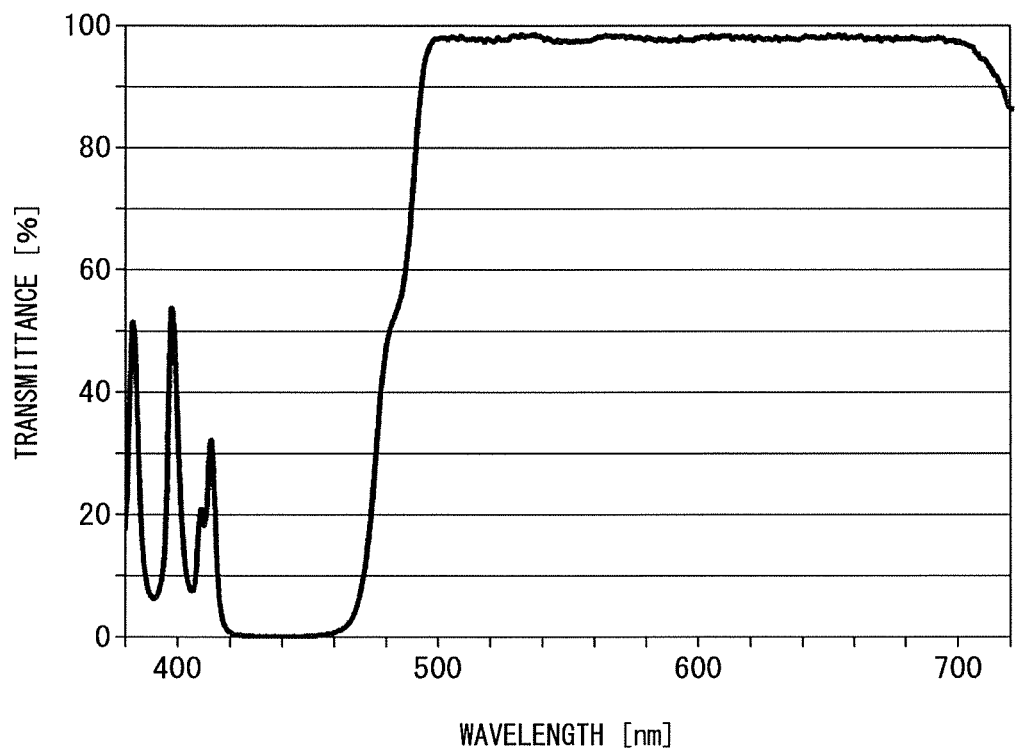
FIG. 3 is a diagram illustrating an example of spectral characteristics of the mirror 4.

FIG. 3 is a diagram illustrating an example of spectral characteristics of the dichroic coat region 41 of the mirror 4, and the horizontal and vertical axes denote wavelength and transmittance, respectively. In the dichroic coat region 41, the wavelength range (about 420 to 470 nm) of the B light does not pass, but wavelength ranges (R, Y, and G) longer than the above wavelength range pass. The spectral characteristics can be implemented by using a dielectric multilayer film ($TiO_2$, $SiO_2$, or the like).

Figure 4:
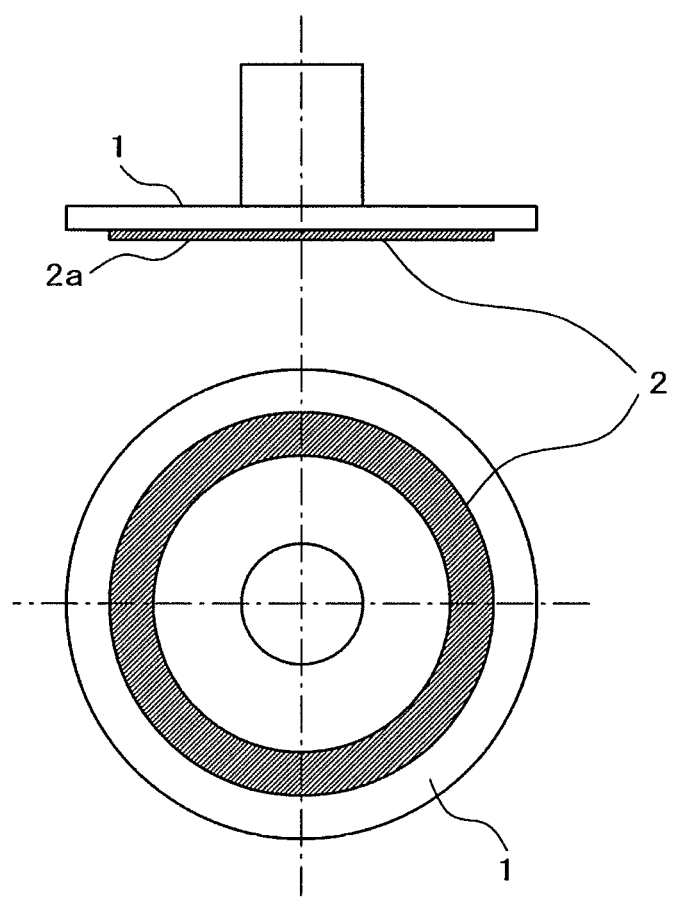
FIG. 4 is a diagram illustrating a specific example of a phosphor wheel 1.

FIG. 4 is a diagram illustrating a specific example of the phosphor wheel 1. The rotatable phosphor wheel 1 is configured to include a Y phosphor 2 which is excited by the excitation light to emit Y fluorescent light. When the Y phosphor 2 receives the excitation light 10, the Y fluorescent light and the diffused excitation light which cannot be converted into the Y fluorescent light but diffused and reflected as the B light are generated from the Y phosphor 2, and the Y fluorescent light and the diffused excitation light are mixed to be substantially white light. The white light is formed as substantially parallel light by the condensing lens 3 to be incident on the mirror 4.

The fluorescent light component of the white light incident on the mirror 4 transmits any region of the dichroic coat region 41 and the wide wavelength transmission region 42. On the other hand, the diffused excitation light component incident on the mirror 4 is reflected on the dichroic coat region 41, but it transmits the wide wavelength transmission region 42. As a result, substantially all the fluorescent light beams and most of the diffused excitation light beams become white illumination light 11 to be emitted downward in the figure (FIG. 1).

In order to allow the phosphor to have an excitation light diffusion function, mechanical processing treatment or chemical surface treatment for forming fine unevenness on a surface 2*a* of the phosphor may be applied to the surface of the phosphor. Alternatively, a thin transmission diffusion plate having high heat resistance may be adhered on the surface 2*a* of the phosphor. Furthermore, in a case where the applied Y phosphor 2 is thin, mechanical processing treatment or chemical surface treatment of forming fine unevenness may be applied to a reflection plane of a substrate of the phosphor wheel 1 before the Y phosphor 2 is applied. In this manner, the reflected excitation light is diffused, so that an effect of removing speckle noise in the laser light is obtained. In addition, the phosphor wheel 1 is rotated, so that the effect of removing the speckle noise is further improved.

Figure 5:
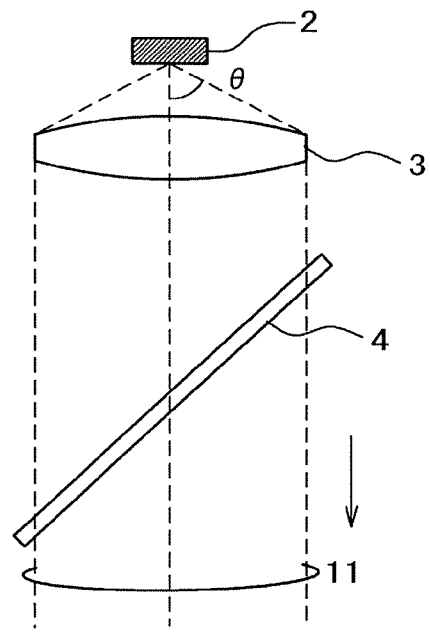
FIG. 5 is a diagram illustrating a degree of diffusion of light emitted from the phosphor wheel 1.

FIG. 5 is a diagram illustrating a degree of diffusion of the light emitted from the phosphor wheel 1. First, the fluorescent light from the Y phosphor 2 of the phosphor wheel 1 is emitted uniformly in all directions and is reflected on a mirror plane formed on the rear surface of the phosphor, so that the fluorescent light is emitted in a semi-spherical shape at the condensing lens 3 side. Among the light beams, the light beams incident on the effective range of the condensing lens 3 reach the mirror 4 to be used as the illumination light 11.

On the other hand, although the diffused excitation light which is diffused as excitation light without conversion into the fluorescent light by the Y phosphor 2 is emitted in a semi-spherical shape at the condensing lens 3 side, the degree of diffusion (diffusion angle $\theta$) can be adjusted by using micro pores on the surface of the phosphor or a material of the diffusion plate. At this time, if the diffusion angle $\theta$ of the emitted diffused excitation light is defined to be too large, the light leaks outside the effective range of the condensing lens 3, so that the efficiency for light utilization is lowered. On the contrary, if the diffusion angle $\theta$ is defined to be too small, the light passes through only the central portion of the effective range of the condensing lens 3. As a result, the ratio of the diffused excitation light incident on the dichroic coat region 41 of the mirror 4 is relatively enlarged, so that the loss of the illumination light is increased. Therefore, preferably, the diffusion angle $\theta$ is adjusted so that the diffused excitation light from the Y phosphor 2 is diffused to be incident with a size of substantially the effective range of the condensing lens 3.

In this manner, any of the fluorescent light and the diffused excitation light generated in the phosphor 2 is emitted from the phosphor wheel 1 to the same side, so that most of the light passes through the mirror 4 to be the white illumination light. Therefore, an additional optical system for combining the two light beams does not need to be installed, so that the device can be miniaturized.

Second Embodiment

Figure 6:
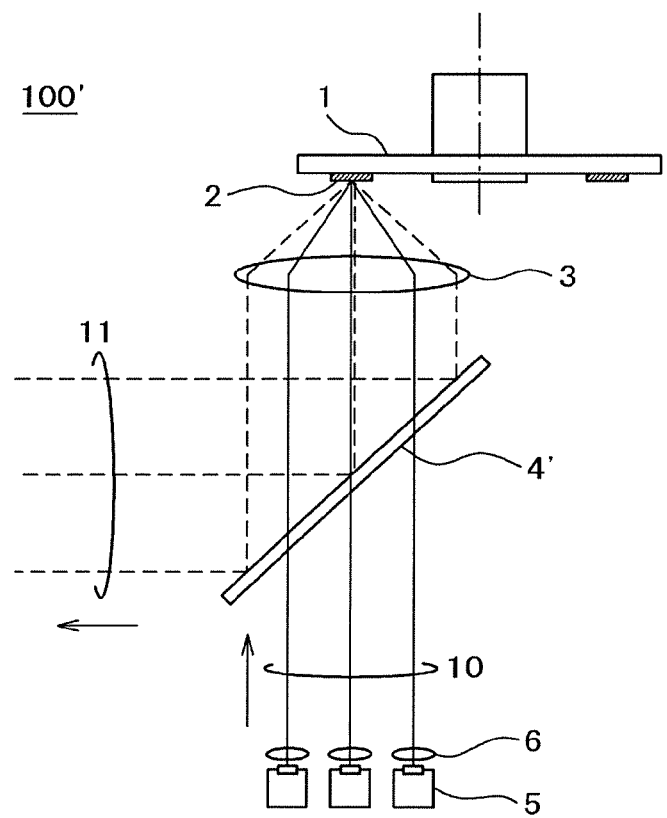
FIG. 6 is a configurational diagram of a light source device according to a second embodiment.

In a second embodiment, a case where a positional relationship between the phosphor wheel 1 and the excitation light source 5 is changed will be described. FIG. 6 is a configurational diagram of a light source device according to the second embodiment. The basic configuration of the light source device 100' is the same as that of the first embodiment (FIG. 1), but the light source device is different from that of the first embodiment in that the excitation light source 5 is arranged in the lower portion of the figure and the illumination light is emitted leftward in the figure by using a mirror 4' of which transmission/reflection characteristics are reverse to those of the mirror 4. Namely, the mirror 4' has a configuration illustrated in FIG. 2. The dichroic coat region 41 has characteristics of transmitting the wavelength range of excitation light (B) and reflecting the wavelength ranges (R, Y, and G) of fluorescent light, and the wide wavelength reflection region 42 has characteristics of reflecting the wavelength ranges of both of the excitation light and the fluorescent light. In addition, in the dichroic coat region 41, the vertical axis of the spectral characteristics illustrated in FIG. 3 is reversed, and in other words, in the vertical axis, the transmittance is replaced with the reflectance.

The excitation light 10 incident from the excitation light source 5 passes through the dichroic coat region 41 of the mirror 4' and is condensed by the condensing lens 3 to be incident on the phosphor wheel 1. When the excitation light 10 is received, Y fluorescent light and B diffused excitation light are generated from the phosphor 2 of the phosphor wheel 1. The fluorescent light and the diffused excitation light are formed as substantially parallel light by the condensing lens 3 to be incident on the mirror 4'.

The fluorescent light incident on the mirror 4' is reflected on any region of the dichroic coat region 41 and the wide wavelength transmission region 42 in the mirror 4'. On the other hand, the diffused excitation light incident on the mirror 4' passes through the dichroic coat region 41, but it is reflected on the wide wavelength reflection region 42. As a result, all the fluorescent light beams and most of the diffused excitation light beams are emitted as the illumination light 11 leftward in the figure (FIG. 6).

According to the configuration, any of the fluorescent light and the diffused excitation light generated in the phosphor wheel 1 is emitted from the phosphor wheel 1 to the same side (downward in the figure), so that most of the light is reflected on the mirror 4' to be the illumination light. Therefore, an additional optical system for combining the two light beams does not need to be installed, so that the device can be miniaturized.

Third Embodiment

In a third embodiment, a case where the phosphor wheel 1 of the light source device according to the above embodiments is replaced with a phosphor plate will be described. Unlike the rotatable phosphor wheel 1, in a fixed phosphor plate, since heat generated in the illumination of the excitation light on the phosphor cannot be cooled by a rotational operation, a phosphor having high heat resistance is needed. In order to obtain the phosphor having high heat resistance, instead of a silicon-based organic binder used for retaining and dispersing the phosphor in the phosphor wheel 1 of the related art, an inorganic binder (glass-based, ceramic-based) is used as a binder of retaining and dispersing the phosphor. In addition, a substrate of the phosphor plate is configured with a metal having good thermal conductivity, so that the phosphor can be cooled. The phosphor wheel 1 is replaced with the phosphor plate, and thus, the area of the phosphor can be reduced, so that the device can be further miniaturized. In addition, the treatment for allowing the phosphor of the phosphor plate to have an excitation light diffusion function is the same as that of the case of the phosphor wheel described in the first embodiment.

Herein, optical axis adjustment in the first to third embodiments will be described. In the light source device, the excitation light emitted from the excitation light source 5 needs to be reflected or transmitted by a specific region (dichroic coat region 41) of the mirror 4 to be condensed at a specific position (phosphor 2) of the phosphor wheel 1. Therefore, with respect to differences in the emission position and direction caused by the excitation light source 5, a mechanism for adjusting the differences is installed.

In the case of the structure where the excitation light source 5 and the collimating lens 6 are integrated, the differences in the emission position and direction of the excitation light are adjusted by integrally moving the excitation light source 5 and the collimating lens 6 in the direction perpendicular to the optical axis. In addition, in the case of the structure where the excitation light source 5 and the collimating lens 6 are separated, the differences in the emission position and direction of the excitation light are adjusted by moving only the collimating lens 6 in the direction perpendicular to the optical axis. Due to the adjusting mechanism, the excitation light emitted from the excitation light source 5 can be securely condensed at a specific position of the phosphor wheel 1 through the mirror 4, so that the intensity of the illumination light can be prevented from being lowered.

Fourth Embodiment

Figure 7:
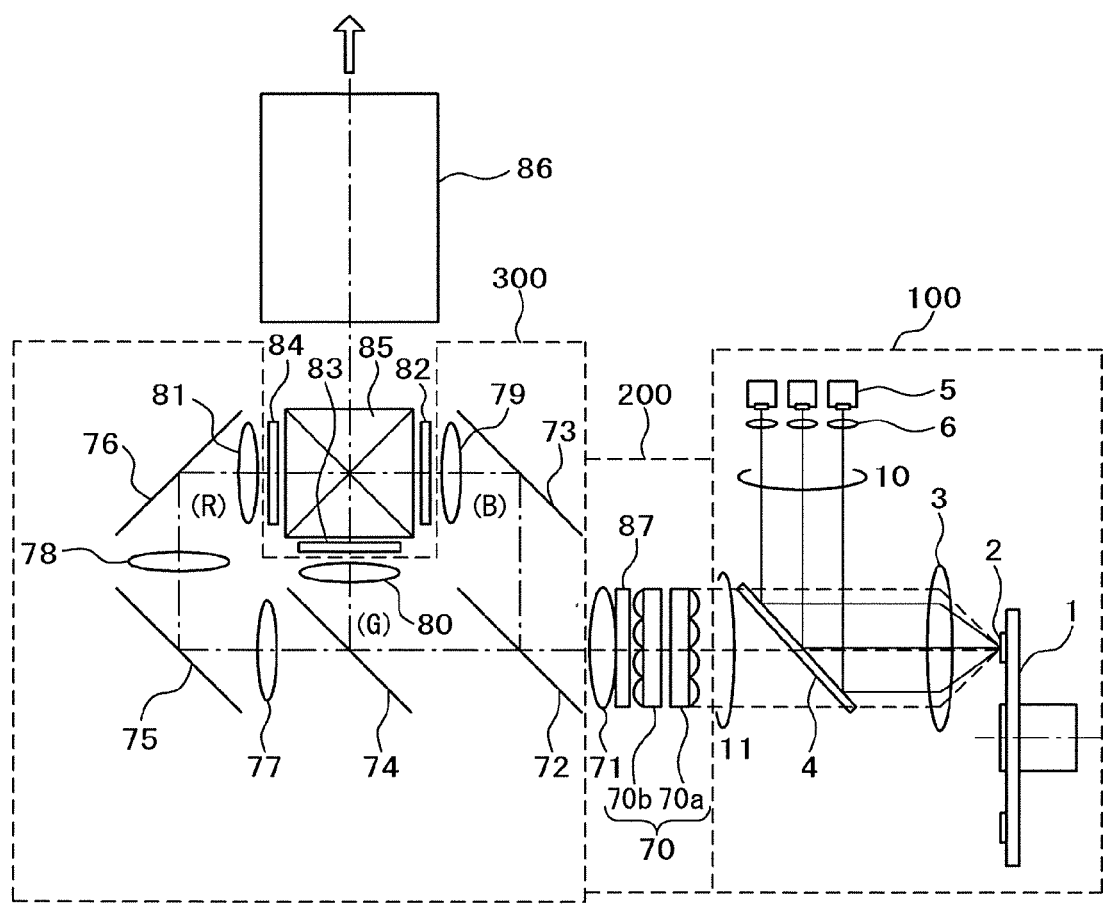
FIG. 7 is a configurational diagram of an optical system of a projection type image display device according to a fourth embodiment.

In a fourth embodiment, an example where the light source device according to the above embodiments is applied to a projection type image display device will be described. FIG. 7 is a configurational diagram of an optical system of the projection type image display device according to the fourth embodiment and illustrates an example where liquid crystal panels corresponding to three colors (R, G, and B) are used as image display elements.

Illumination light (fluorescent light and diffused excitation light) 11 passing through the mirror 4 of the light source device 100 propagates to an illumination optical system 200. The illumination optical system 200 is configured to include an integrator optical system 70, a polarization conversion element 87, and a superimposing lens 71.

The integrator optical system 70 is configured to include a first fly-eye lens 70a and a second fly-eye lens 70b, each of which is formed by arranging a plurality of element lenses in a matrix shape. The plurality of of the element lenses constituting the first fly-eye lens 70a split and individually condense the illumination light 11. The plurality of the element lenses constituting the second fly-eye lens 70b emit the split light flux from the first fly-eye lens 70a at an appropriate divergence angle. By doing so, the integrator optical system 70 allows the light intensity distribution of the illumination light 11 to be uniform.

The polarization conversion element 87 is formed by arranging a set of a PBS, a mirror, a phase difference plate, and the like in an array shape to align the polarization direction of each partial light flux split by the first fly-eye lens 70a with one-directional linear polarization.

The superimposing lens 71 appropriately, as a whole, converges the illumination light passing through the polarization conversion element 87 and allows superimposing illumination on the illumination areas of the liquid crystal panels 82, 83, and 84.

The color separation optical system 300 divides the light from the the illumination optical system 200 into the R light, the G light, and the B light and guides the light beams to the corresponding liquid crystal panels. The B light is reflected on a dichroic mirror 72 and passes through a reflecting mirror 73 and a field lens 79 to be incident on the liquid crystal panel 82 for the B light. The G light and the R light pass through the dichroic mirror 72 and, after that, are divided by a dichroic mirror 74. The G light is reflected on the dichroic mirror 74 and passes through a field lens 80 to be incident on the liquid crystal panel 83 for the G light. The R light passes through the dichroic mirror 74 and passes through relay lenses 77 and 78, reflecting mirrors 75 and 76, and a field lens 81 to be incident on the liquid crystal panel 84 for the R light.

The liquid crystal panels 82, 83, and 84 modulate the respective incident color light beams according to the respective image signals to form optical images of the respective color light beams. The optical images of the respective color light beams are incident on a color combining prism 85. In the color combining prism 85, a dichroic film reflecting the B light and a dichroic film reflecting the R light are formed in a substantially X shape. The B light and the R light incident from the liquid crystal panels 82 and 84 are reflected by the dichroic film for the B light and the dichroic film for the R light, respectively. The G light incident from the liquid crystal panel 83 passes through the dichroic films. As a result, the optical images of the color light beams are combined to be emitted as color image light. The combined light emitted from the color combining prism 85 is incident on a projecting lens 86 to be projected on a screen (not illustrated).

In addition, the example where the light source device according to the above embodiments is applied to the projection type image display device is not limited to a transmission type liquid crystal element, but a reflection type liquid crystal element may be used.

Fifth Embodiment

Figure 8:
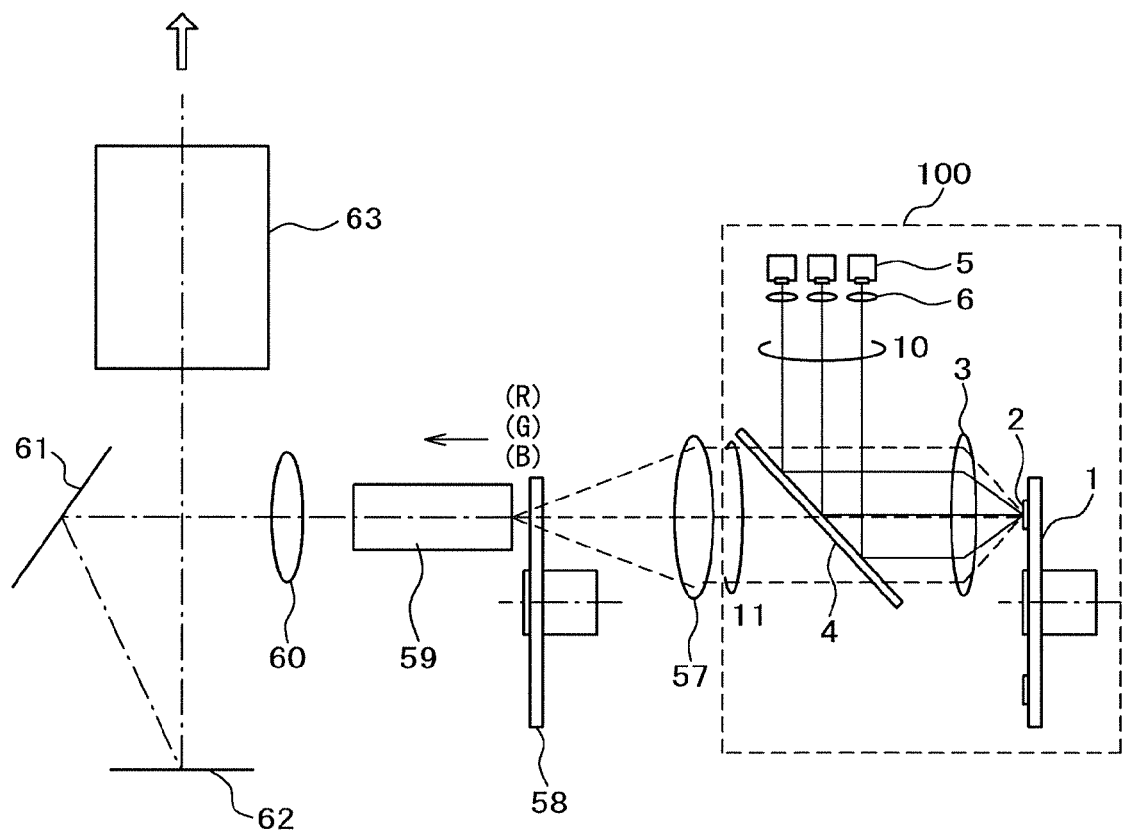
FIG. 8 is a configurational diagram of an optical system of a projection type image display device according to a fifth embodiment.

A fifth embodiment is another example of the projection type image display device, and an example where the light source device is applied to a DMD (digital mirror device) as an image display element will be described. FIG. 8 is a configurational diagram of an optical system of the projection type image display device according to the fifth embodiment.

Illumination light (fluorescent light and diffused excitation light) 11 passing through the mirror 4 of the light source device 100 is condensed by a condensing lens 57 and passes through a color wheel 58 to be incident on a multiple-reflection element 59.

The color wheel 58 is configured so that three color filters for three colors (R, G, and B) are arranged in a shape of a disc. White light of the illumination light 11 emitted from the light source device 100 passes through the color filters to be split into three color light beams having predetermined wavelengths.

The three color light beams incident on the multiple-reflection element 59 are reflected several times in the multiple-reflection element 59 to be formed as light having uniform luminance distribution. The three color light beams emitted from an emission aperture plane of the multiple-reflection element 59 pass through a condensing lens 60 and are reflected on a reflecting mirror 61, and after that, are irradiated on an image display element 62 with uniform luminance distribution.

In synchronization with the color wheel 58 and the image display element 62, the three color light beams are irradiated on the image display element 62 in a time division, so that the respective color light beams are modulated. The respective color light beams reflected on the image display element 62 become image light beams and are incident on the projecting lens 63 to be projected on a screen (not illustrated).

In addition, in the fourth and fifth embodiments, instead of the light source device 100, the light source device 100' of FIG. 5 may be used, and the phosphor wheel in the light source device 100/100' may be replaced with a phosphor plate.

The projection type image display device uses a small-sized light source device which has a small size and a reduced loss of the illumination light, so that miniaturization and high performance of the projection type image display device can be obtained.

REFERENCE SIGNS LIST

1: phosphor wheel
2: phosphor
3: condensing lens
4: mirror
5: excitation light source
6: collimating lens
10: excitation light
11: illumination light (fluorescent light and diffused excitation light)
41: dichroic coat region (first region)
42: wide wavelength transmission region (second region)
100: light source device
200: illumination optical system
300: color separation optical system

The invention claimed is:

1. A light source device comprising:
first and second light sources which generate blue laser light as excitation light;
a phosphor which is excited by the excitation light from the first and second light sources to generate yellow fluorescent light; and
a mirror which guides the excitation light from the first and second light sources to the phosphor and transmits the fluorescent light from the phosphor,
wherein the mirror includes a first region which reflects the excitation light and transmits the fluorescent light and a second region which transmits the fluorescent light and diffused excitation light which is diffused and reflected in the phosphor, and
wherein the first region is installed corresponding to a first portion on which the excitation light from the first light source is incident and a second portion on which the excitation light from the second light source is incident.

2. A light source device comprising:
first and second light sources which generate blue laser light as excitation light;
a phosphor which is excited by the excitation light from the first and second light sources to generate yellow fluorescent light; and
a mirror which guides the excitation light from the first and second light sources to the phosphor and reflects the fluorescent light from the phosphor,
wherein the mirror includes a first region which transmits the excitation light and reflects the fluorescent light and a second region which reflects the fluorescent light and diffused excitation light which is diffused and reflected in the phosphor, and wherein the first region is installed corresponding to a first portion on which the excitation light from the first light source is incident and a second portion on which the excitation light from the second light source is incident.

3. A light source device comprising:
first and second light sources which generate blue laser light as excitation light;
a phosphor which is excited by the excitation light from the first and second light sources to generate yellow fluorescent light; and
a mirror which guides the excitation light from the first and second light sources to the phosphor and transmits the fluorescent light from the phosphor,
wherein the mirror includes a first region which reflects the excitation light and transmits the fluorescent light and a second region which transmits the fluorescent light and diffused excitation light which is diffused and reflected in the phosphor, and
wherein the first region is a single region including a first portion on which the excitation light from the first light source is incident and a second portion on which the excitation light from the second light source is incident.

4. A light source device comprising:
first and second light sources which generate blue laser light as excitation light;
a phosphor which is excited by the excitation light from the first and second light sources to generate yellow fluorescent light; and
a mirror which guides the excitation light from the first and second light sources to the phosphor and reflects the fluorescent light from the phosphor,
wherein the mirror includes a first region which transmits the excitation light and reflects the fluorescent light and a second region which reflects the fluorescent light and diffused excitation light which is diffused and reflected in the phosphor, and
wherein the first region is a single region including a first portion on which the excitation light from the first light source is incident and a second portion on which the excitation light from the second light source is incident.

5. The light source device according to claim 1, wherein the phosphor is a phosphor wheel.

6. The light source device according to claim 2, wherein the phosphor is a phosphor wheel.

7. The light source device according to claim 3, wherein the phosphor is a phosphor wheel.

8. The light source device according to claim 4, wherein the phosphor is a phosphor wheel.

9. The light source device according to claim 1, wherein the phosphor is a phosphor plate.

10. The light source device according to claim 2, wherein the phosphor is a phosphor plate.

11. The light source device according to claim 3, wherein the phosphor is a phosphor plate.

12. The light source device according to claim 4, wherein the phosphor is a phosphor plate.

13. The light source device according to claim 1, wherein the fluorescent light and the diffused excitation light are mixed to generate white light.

14. The light source device according to claim 2, wherein the fluorescent light and the diffused excitation light are mixed to generate white light.

15. The light source device according to claim 3, wherein the fluorescent light and the diffused excitation light are mixed to generate white light.

16. The light source device according to claim 4, wherein the fluorescent light and the diffused excitation light are mixed to generate white light.

17. A projection type image display device comprising:
a light source device;
an image display element which modulates each color light beam according to an input signal; and
    a projection unit which projects light modulated by the image display element, and
    said light source device includes:
    first and second light sources which generate blue laser light as excitation light;
    a phosphor which is excited by the excitation light from the first and second light sources to generate yellow fluorescent light; and
    a mirror which guides the excitation light from the first and second light sources to the phosphor and transmits the fluorescent light from the phosphor,
    wherein the mirror includes a first region which reflects the excitation light and transmits the fluorescent light and a second region which transmits the fluorescent light and diffused excitation light which is diffused and reflected in the phosphor, and
    wherein the first region is installed corresponding to a first portion on which the excitation light from the first light source is incident and a second portion on which the excitation light from the second light source is incident.

* * * * *